(12) United States Patent
Atallah et al.

(10) Patent No.: US 7,853,018 B2
(45) Date of Patent: Dec. 14, 2010

(54) METHOD AND APPARATUS FOR HIDING A PRIVATE KEY

(76) Inventors: Mikhail J. Atallah, 3400 Elkhart St., West Lafayette, IN (US) 47906; Eric D. Bryant, 3882 Amber La., West Lafayette, IN (US) 47906

( * ) Notice: Subject to any disclaimer, the term of this patent is extended or adjusted under 35 U.S.C. 154(b) by 980 days.

(21) Appl. No.: 11/558,765

(22) Filed: Nov. 10, 2006

(65) Prior Publication Data

US 2007/0127721 A1    Jun. 7, 2007

Related U.S. Application Data

(60) Provisional application No. 60/735,906, filed on Nov. 10, 2005.

(51) Int. Cl.
*H04L 9/08* (2006.01)
(52) U.S. Cl. .................................................. 380/277
(58) Field of Classification Search .............. 380/277, 380/280
See application file for complete search history.

(56) References Cited

U.S. PATENT DOCUMENTS

| | | | | |
|---|---|---|---|---|
| 4,309,569 | A * | 1/1982 | Merkle | 713/177 |
| 5,432,852 | A * | 7/1995 | Leighton et al. | 380/30 |
| 5,592,552 | A | 1/1997 | Fiat | |
| 6,226,743 | B1 * | 5/2001 | Naor et al. | 713/177 |
| 6,411,715 | B1 | 6/2002 | Liskov | |
| 6,532,543 | B1 | 3/2003 | Smith | |
| 6,542,610 | B2 | 4/2003 | Traw | |
| 6,594,761 | B1 | 7/2003 | Chow | |
| 6,779,114 | B1 | 8/2004 | Chow et al. | |
| 6,823,068 | B1 * | 11/2004 | Samid | 380/28 |

(Continued)

FOREIGN PATENT DOCUMENTS

EP    0946018 A2    9/1999

(Continued)

OTHER PUBLICATIONS

Atallah et al., "Survey of Anti-Tamper Technologies," CrossTalk: The Journal of Defense Software Engineering, Nov. 2004, pp. 12-16.

(Continued)

*Primary Examiner*—Kimyen Vu
*Assistant Examiner*—Sayed Beheshti Shirazi
(74) *Attorney, Agent, or Firm*—Taft, Stettinius & Hollister, LLP

(57) ABSTRACT

A method and system for hiding an encryption key. The method including creating a directed graph having a plurality of vertices and edges, including a source and a sink vertex. Each vertex has a vertex value. The source vertices have a common source value, and the sink vertices have a common sink value, the sink value being a function of the source value and the encryption key. Each edge has an edge value that is a function of $r(in)^{-1}$ and $r(out)$ where $r(in)^{-1}$ is the functional inverse of the vertex value of the predecessor vertex and $r(out)$ is the vertex value of the successor vertex. A message enters a source vertex; flows along a path from the source vertex to a sink vertex; and leaves the sink vertex, where the output message is an encrypted or decrypted version of the input message using the private encryption key.

20 Claims, 2 Drawing Sheets

U.S. PATENT DOCUMENTS

| | | | |
|---|---|---|---|
| 6,826,687 B1 * | 11/2004 | Rohatgi | 713/171 |
| 6,842,862 B2 | 1/2005 | Chow | |
| 6,912,654 B2 | 6/2005 | Murakami | |
| 6,950,518 B2 | 9/2005 | Henson | |
| 7,539,697 B1 * | 5/2009 | Akella et al. | 707/102 |
| 7,574,518 B2 * | 8/2009 | Jaggi et al. | 709/234 |
| 7,634,091 B2 * | 12/2009 | Zhou et al. | 380/277 |
| 2004/0078775 A1 | 4/2004 | Chow | |
| 2004/0139340 A1 | 7/2004 | Johnson | |
| 2005/0002532 A1 * | 1/2005 | Zhou et al. | 380/277 |
| 2005/0036615 A1 | 2/2005 | Jakobsson | |
| 2005/0138392 A1 | 6/2005 | Johnson | |
| 2005/0175176 A1 | 8/2005 | Venkatesan | |
| 2005/0220299 A1 | 10/2005 | Lipson | |
| 2005/0220302 A1 | 10/2005 | Mironov | |
| 2005/0246554 A1 | 11/2005 | Batson | |
| 2006/0015514 A1 * | 1/2006 | Suga | 707/100 |
| 2007/0016769 A1 * | 1/2007 | Gentry et al. | 713/163 |

FOREIGN PATENT DOCUMENTS

| | | |
|---|---|---|
| JP | 2004004341 A | 1/2004 |
| WO | WO03065639 A2 | 8/2003 |
| WO | WO2004006497 A1 | 1/2004 |

OTHER PUBLICATIONS

Yao, Andrew, "Protocols Secure Computations," IEEE 1982, pp. 1-5.

Goldreich et al., "How to Play Any Mental Game: A Completeness Theorem for Protocols with Honest Majority," ACM 1987, pp. 218-229.

Yao, Andrew, "How to Generate and Exchange Secrets," 27th Annual Symposium on Foundations of Computer Science, IEEE Computer Society, 1986, pp. 162-167.

Goldreich, Oded, "Secure Multi-Party Computations (Working Draft)," Weizmann Institute of Science, Rehovot, Israel, 1998, pp. 1-107.

* cited by examiner

METHOD AND APPARATUS FOR HIDING A PRIVATE KEY

CROSS-REFERENCE TO RELATED APPLICATIONS

This application claims the benefit of U.S. Provisional Application Ser. No. 60/735,906, filed on Nov. 10, 2005, entitled "Method and Apparatus for Hiding a Private Key," which is incorporated herein by reference.

BACKGROUND OF THE INVENTION

The present invention relates generally to the field of data encryption and decryption, and more specifically to a method and system for hiding a secret key. The security of information poses challenges for businesses and other organizations that transmit, store and distribute information. Cryptographic systems are intended to transform data into a form that is only readable by authorized users.

There has been a dramatic increase in the need for cryptographic systems that can protect digital data from potential hackers, eavesdroppers, forgers, and other adversaries. This is largely due to the fact that an ever increasing portion of business and communications involve software and digital electronics. In addition, the sophistication of potential adversaries and the equipment at their disposal continues to improve, which makes the problem of protecting digital data even more pressing.

Cryptographic systems are adapted to utilize and transfer information without it being compromised by adversaries. Such systems utilize keys for encoding and decoding information. Information to be protected (M) is encoded using an encoding key to produce an encoded version of the message, or cipher-text (C). The ciphertext C can then be decoded using a decoding key to recover the original message M.

In some instances the software and information to be protected is expected to execute in potentially hostile environments. In these situations, the keys used to decode the protected information must be protected even from the user. These are execution environments in which the adversary who is running the software has complete control over the machine on which it executes.

SUMMARY OF THE INVENTION

In situations where the software and information to be protected is expected to execute in a potentially hostile environment, it is desirable that the private key used in the decryption of information never "shows its face" even as the software uses it to decrypt. This keeps the private key hidden from both static analysis and dynamic analysis. It is desirable that the private key's bits never actually appear even in non-contiguous memory locations at any point during the execution of the software. Instead, a number of apparently random keys are used, whose combined net effect is as if the private key had been used. This can be achieved through algebraic decompositions of the private key.

It is also desirable that the number of above-mentioned algebraic decompositions be very large. Making the number of algebraic decompositions of the private key very large, preferably more than the number of executions of the software during its lifetime, makes it very difficult for the adversary to determine the private key. At the same time, it is desirable that the algebraic decompositions take little storage space and execution time.

It is preferable that the different decompositions are used randomly. In each execution of the software, one of the decompositions is randomly selected and used. By using a different decomposition each time, it makes it much more difficult for an adversary to break the encryption. An adversary may carry out a differential analysis of various execution traces thinking that the decryption routine executes in all of these traces and can therefore be pinpointed. By using a different randomly selected decomposition each time, the adversary is frustrated. This "raises the bar" and forces the adversary to do detailed semantic analyses of the code and its behavior.

It is also preferable that the decompositions be "evanescent." Each of the random numbers that make up the decomposition is preferably generated at run-time and is evanescent in the sense that it briefly appears and then disappears.

It is also desirable to use obfuscation and tamperproofing techniques to disguise the elements of the decompositions. The different random numbers that make up a decomposition of the private key should be used in seemingly different ways, even if they are in fact functionally equivalent. This makes it difficult for the adversary to logically link the random numbers together. The security of the scheme is enhanced when an execution trace shows a huge number (call it N) of values, and even if the adversary knows that k of those values are a decomposition of the private key, he does not know which k they are, especially if there are too many combinations of k values out of N for him to test all of them.

It is also desirable that the above-mentioned algebraic decompositions be dynamically evolving. In other words that the decompositions mutate after every use without changing the secret key. This makes it very difficult for the adversary because even if the adversary determines part of the decomposition, it can change making the adversary's prior work meaningless.

Additional features and advantages of the invention will become apparent to those skilled in the art upon consideration of the following detailed description of illustrated embodiments.

BRIEF DESCRIPTION OF THE FIGURES

Aspects of the present invention are more particularly described below with reference to the following figures, which illustrate exemplary embodiments of the present invention

DETAILED DESCRIPTION OF EXEMPLARY EMBODIMENTS

Figure 1:
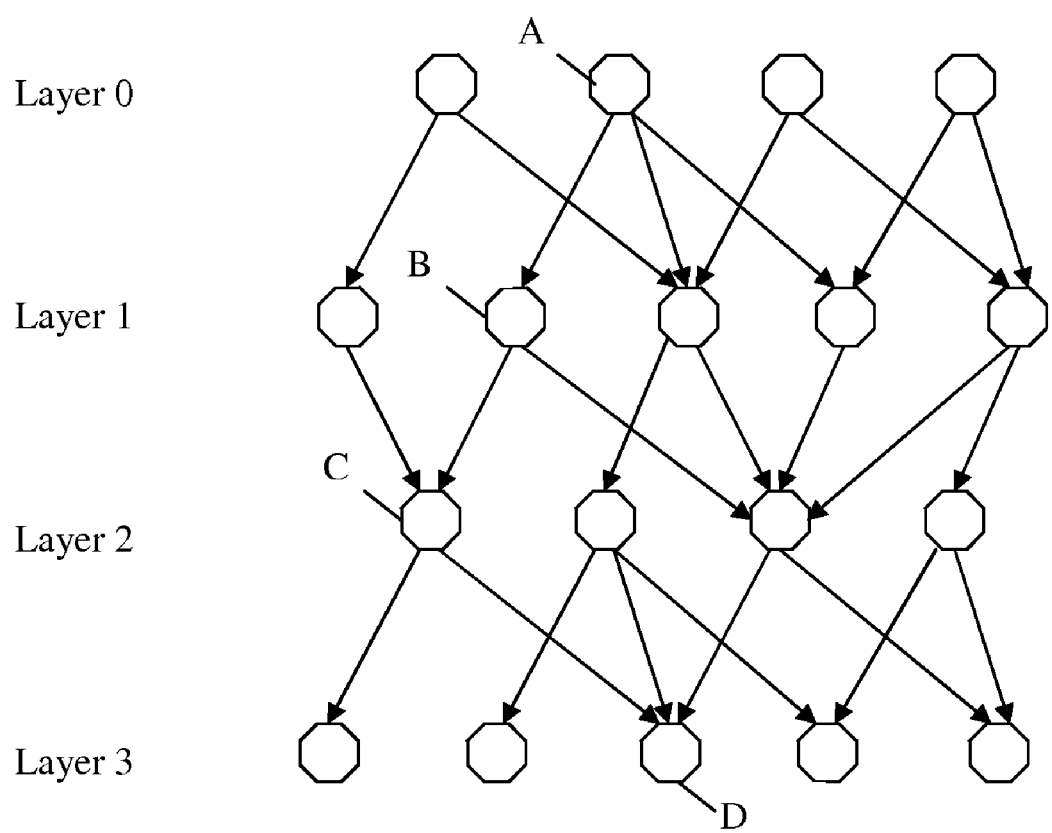
FIG. 1 shows a layered directed acyclic graph.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The following description provides examples of the techniques for RSA and elliptic curve cryptosystems (ECC), but it will be clear to those skilled in the art that this technique can easily be modified for El Gamal and other public-key cryptosystems.

RSA Example

In the following discussion, the standard RSA notation is used. Two different large prime numbers p and q are chosen, and the value n is determined as n=pq. The public key e, and the private key d have the relationship:

$$ed \bmod (p-1)(q-1)=1.$$

Encryption of a message M is done using the public key e by computing the cipher-text $$C = M\char`\^e \bmod n$$

where "^" denotes exponentiation. Decryption recovers the message M using the private key d by computing $$M = C\char`\^d \bmod n.$$

One method for hiding d consists of replacing the computation of $M=C\char`\^d \bmod n$ by the sequence of computations $$C_0 = C$$

$$C_1 = C_0\char`\^d_1 \bmod n$$

$$C_2 = C_1\char`\^d_2 \bmod n$$

...

$$C_k = C_{k-1}\char`\^d_k \bmod n$$

Combining the above equations results in $$C_k = C\char`\^(d_1 d_2 d_3 \ldots d_k) \bmod n$$

and therefore, if we choose the $d_j$'s such that $$d_1 d_2 d_3 \ldots d_k \bmod (p-1)(q-1) = d$$

we will have $C_k = M$.

The main benefit of doing the above is that it forces the attacker to piece together the roles of the $d_i$'s, which can be made harder by obfuscating the $C_i$ computations so they do not look similar to each other.

The $d_i$'s are selected to be relatively prime to (p−1)(q−1), and all but $d_k$ are selected randomly. The value of $d_k$ is computed using the Extended Euclid algorithm for computing multiplicative inverses modulo (p−1)(q−1):

$$d_k = (d_1 d_2 d_3 \ldots d_{k-1})^{-1} d \bmod (p-1)(q-1)$$

where $(d_1 d_2 d_3 \ldots d_{k-1})^{-1}$ is the multiplicative inverse of $(d_1 d_2 d_3 \ldots d_{k-1})$ modulo (p−1)(q−1). An algorithm for carrying out the Extended Euclid algorithm to compute multiplicative inverses can be found in many cryptography textbooks and handbooks. The algorithm for modular exponentiation (computing $a\char`\^b \bmod c$ for integers a, b, c) is also found in many textbooks on cryptography and computational number theory, often under the so-called "repeated-squaring" algorithm.

That the $d_i$'s are random is an advantage, because it is then easy to generate them at run-time so they are not revealed to a static analysis of the software. There are many ways of doing this, for example, they could be evanescent values that appear briefly during the execution of some complicated routine (whose main purpose is in fact to generate them, although it appears to be doing something else).

In the above technique, the same set of $d_i$'s get used in every execution of the software, and this can be revealed through differential analysis of different execution traces. It would be desirable if every execution involves different sets of (possibly overlapping) $d_i$'s. This is achieved by the method describe next.

The following method uses different sets of (possibly overlapping) $d_i$'s for different executions of the program. In this method, a layered directed acyclic graph is generated at software-creation-time. A layered directed graph is a graph such as that shown in FIG. 1, in which the vertices are partitioned into k+1 layers $L_0, L_1, \ldots, L_k$ such that every edge whose tail is connected to a predecessor vertex in layer j must have its head connected to a successor vertex in layer j+1. FIG. 1 shows an example of a layered directed acyclic graph.

The graph will be used to help illustrate the process of hiding the key, in the following way:

For all but the first and last layers, an integer r(v) is associated with every vertex v. The integer r(v) is relatively prime to (p−1)(q−1). The vertices of the first layer all get the same r(v) associated with them, call it $r_0$. An r(v) equal to $r_0 * d$, where d is the private key, is associated with every vertex v of the last layer (layer k). The r(v) values are not explicitly stored in the software, but they are introduced here to aid in the description of the key-hiding method.

With every edge from vertex v to vertex w, an integer d(v,w) is computed as follows:

$$d(v,w) = r(v)^{-1} r(w) \bmod (p-1)(q-1)$$

If we call the vertices in the first layer the source vertices, and those in the last layer the sink vertices, then the following holds: For every source-to-sink path, the product modulo (p−1)(q−1) of the integers on that path's edges equals the secret key.

For each such source-to-sink path, the computations that are done by the software correspond to the integers on the edges of that path. The ciphertext entering the tail of a path edge (v,w) from a predecessor vertex is raised, modulo n, to the power d(v,w), thereby generating the ciphertext output to a successor vertex through the head of the path edge. What "enters" the first path edge (call it edge (v,w)) is $C_0 = M\char`\^e \bmod n$, and what leaves it is $M\char`\^(e r(v)^{-1} r(w)) \bmod n$. What "leaves" the last edge is $$C_k = M\char`\^(e * (\text{product of integers on path's edges})) \bmod n$$

which equals $M\char`\^(ed) \bmod n$, which equals the plaintext message M.

Using the acyclic layered graph of FIG. 1, assume the randomly selected source-to-sink path passes through the vertices A, B, C and D. The first path edge has its tail connected to predecessor vertex A and its tail connected to successor vertex B. What enters the tail of the first path edge (A, B) is the encrypted message:

$$C_0 = M\char`\^e \bmod n$$

and what leaves the head of the first path edge is $$C_1 = C_0 \char`\^ d(A, B) \bmod n$$

$$= M \char`\^ (e r(A)^{-1} r(B)) \bmod n$$

However, r(v) for all the vertices of the first layer is $r_0$, thus $r(A)=r_0$, and $$C_1 = M^{\wedge}(er_0^{-1}r(B)) \bmod n$$

The second path edge has its tail connected to predecessor vertex B and its head connected to successor vertex C. $C_1$ enters the tail of the second path edge (B, C) and the following computation:

$$C_2 = C_1{}^{\wedge}d(B,C) \bmod n$$
$$= M^{\wedge}(er_0^{-1}r(B)r(B)^{-1}r(C)) \bmod n$$

The third and last path edge has its tail connected to predecessor vertex C and its head connected to successor vertex D. $C_2$ enters the third path edge (C,D) and the following computation:

$$C_3 = C_2{}^{\wedge}d(C,D) \bmod n$$
$$= M^{\wedge}(er_0^{-1}r(B)r(B)^{-1}r(C)r(C)^{-1}r(D)) \bmod n$$

However, r(v) for all the vertices of the last layer is $r_0$ d, and $$C_3 = M^{\wedge}(er_0^{-1}r(B)r(B)^{-1}r(C)r(C)^{-1}r_0 d) \bmod n$$

which simplifies to:

$$C_3 = M^{\wedge}(ed) \bmod n$$

which equals the plaintext message M, which is what is output at the head of the last path edge (C,D).

Note that only the d(v, w) values appear during the execution of the program, which are, in this example:

$$d(A,B) = r_0^{-1}r(B)$$
$$d(B,C) = r(B)^{-1}r(C)$$
$$d(C,D) = r(C)^{-1}r_0 d$$

The individual r(v) values do not appear separately, and most importantly, the private key, d, is never exposed during the decryption.

By having many layers, and many edges from each layer to the next, there are exponentially many source-to-sink paths, all of which achieve the same result of implicitly decrypting with the private key without that key ever explicitly appearing during execution. For example, if there are 21 layers and every vertex in the first 20 layers has out-degree 10, then the number of different source-to-sink paths is 10^20. In that case, there are almost certainly more different source-to-sink paths than the total number of times the software will execute in its lifetime. Randomization can be used to select which source-to-sink path is used in a particular execution of the software. An adversary who carries out a differential analysis of various execution traces, thinking that the decryption routine executes in all of these traces and can therefore be pinpointed, is thereby foiled because different paths are used in different executions. This "raises the bar" and forces the adversary to do detailed semantic analyses of the code and its behavior.

ECC Example

Recall that, in an elliptic curve cryptosystem (ECC), the algebra involves the group of points on an elliptic curve. There is a public key P, a private key x, and a public key Q=xP. Encryption of a message M is done by selecting a random r and computing the pair:

$$rP \text{ and } M+rQ$$

which together are the encryption of M. Decryption recovers M by computing x(rP) and subtracting the result from M+rQ, $$M = (M + rQ) - x(rP)$$
$$= M + r(xP) - x(rP)$$
$$= M$$

thereby recovering M.

A simple method for hiding x consists of replacing the decryption computation, i.e., M+rQ−x(rP), by the sequence of computations $$C_0 = (M+rQ)$$
$$C_1 = C_0 - x_1(rP)$$
$$C_2 = C_1 - x_2(rP)$$
$$\ldots$$
$$C_k = C_{k-1} - x_k(rP)$$

Combining the above equations gives:

$$C_k = (M+rQ) - (x_1 + x_2 + x_3 + \ldots + x_k)(rP)$$

and therefore, if we choose the $x_j$'s such that $$x_1 + x_2 + x_3 + \ldots + x_k = x$$

then we will have $C_k = M$.

An algorithm for carrying out the addition of points on the elliptic curve can be found in many cryptography textbooks and handbooks. The algorithm for modular exponentiation (computing a^b mod c for integers a, b, c) is also found in many textbooks on cryptography and computational number theory, often under the so-called "repeated-squaring" algorithm. The ECC algorithm for computing rP, which is equivalent to P added to itself r times, is very similar to the repeated-squaring algorithm except that instead of squaring you now have doubling. In the repeated squaring algorithm the values of a^2 mod c, a^4 mod c, a^8 mod c, a^16 mod c, etc. are calculated, whereas in the algorithm for computing rP, the values of 2P, 4P, 8P, 16P, ... etc, are calculated.

The main benefit of separating the decryption into a sequence of computations is that it forces the attacker to piece together the roles of the $x_i$'s, which can be made harder by obfuscating the $C_i$ computations so they do not look similar to each other. The $x_i$'s can be positive or negative, and all but $x_k$ are selected randomly, whereas $x_k$ is computed as:

$$x_k = x - (x_1 + x_2 + x_3 + \ldots + x_{k-1}).$$

That the $x_i$'s are random is an advantage, because it is then easy to generate them at run-time so they are not revealed to a static analysis of the software. There are many ways of doing this, for example, they could be evanescent values that appear briefly during the execution of some complicated routine whose main purpose is in fact to generate them, although it appears to be doing something else.

One disadvantage with the above is that the same $x_i$ get used in every execution of the software, and this can be revealed through differential analysis of different execution traces. It would be desirable if every execution involves different sets of (possibly overlapping) $x_i$'s. This is achieved by the method described below.

The following method uses different sets of (possibly overlapping) $x_i$'s for different executions of the program. In this method, a layered directed acyclic graph is generated at protect-time, such as the layered directed graph shown in FIG. 1.

The graph is used to guide the process of hiding the key, in the following way:

For all but the first and last layer, a random integer $r(v)$ is associated with every vertex v.

The vertices of the first layer all get the same $r(v)$ associated with them, call it $r_0$. An $r(v)$ equal to $x+r_0$, where x is the private key, is associated with every vertex v of the last layer (layer k). Of course the $r(v)$'s are not explicitly stored in the software, but are introduced here for the sake of describing the key-hiding method.

With every edge from vertex v to vertex w, an integer $d(v,w)$ is computed as follows:

$$d(v,w) = r(w) - r(v).$$

If we call the vertices in the first layer the source vertices, and those in the last layer the sink vertices, then the following holds: For every source-to-sink path, the sum of the integers on that path's edges equals the secret key x.

For each such source-to-sink path, the computations that are done by the software correspond to the integers on the edges of that path: The ciphertext entering from a predecessor vertex through the tail of an edge (v,w) is modified by subtracting from it $(r(w)-r(v))(rP)$, thereby generating the ciphertext to be output to a successor vertex through the head of the edge. What "enters" the first path edge (call it edge (v,w)) is $$C_0 = (M+rQ),$$

and what leaves it is $$C_1 = (M+rQ) - (r(w) - r(v))(rP)$$

What leaves the last edge is $$C_k = (M+rQ) - (\text{sum of integers on path's edges})(rP)$$

which equals $M+rQ-x(rP)$, which equals the plaintext message M.

Using the acyclic layered graph of FIG. 1 again, assume the randomly selected source-to-sink path passes through the vertices A, B, C and D. The first path edge has its tail connected to predecessor vertex A and its head connected to successor vertex B. What enters the first path edge (A, B) is the encrypted message $$C_0 = M+rQ$$

and what leaves the first path edge is $$C_1 = C_0 - (r(B) - r(A))(rP)$$
$$= (M+rQ) - (r(B) - r(A))(rP)$$

However, $r(v)$ for all the vertices of the first layer is $r_0$, thus $r(A)=r_0$, and $$C_1 = (M+rQ) - (r(B) - r_0)(rP)$$

The second path edge has its tail connected to predecessor vertex B and its head connected to successor vertex C. $C_1$ enters the second path edge (B, C) and the following computation:

$$C_2 = C_1 - (r(C) - r(B))(rP)$$
$$= (M+rQ) - (r(B) - r_0)(rP) - (r(C) - r(B))(rP)$$
$$= (M+rQ) - (r(B) - r(B) + r(C) - r_0)(rP)$$

The third and last path edge has its tail connected to predecessor vertex C and its head connected to successor vertex D. $C_2$ enters the third path edge (C,D) and the following computation:

$$C_3 = C_2 - (r(D) - r(C))(rP)$$
$$C_3 = (M+rQ) - (r(B) - r(B) + r(C) - r_0)(rP) - (r(D) - r(C))(rP)$$
$$= (M+rQ) - (r(B) - r(B) + r(C) - r(C) + r(D) - r_0)(rP)$$

However, since $r(v)$ for the last layer is $x+r_0$, $$C_3 = (M+rQ) - (r(B) - r(B) + r(C) - r(C) + (x+r_0) - r_0)(rP)$$
$$= (M+rQ) - x(rP)$$
$$= M + r(xP) - x(rP)$$

which equals the plaintext message M, which is what leaves the last path edge (C,D).

Note in this example as well that only the combination edge values appear during the execution of the program, which are, in this example:

$r(B)-r_0$, $r(C)-r(B)$, and $x+r_0-r(D)$

The individual $r(v)$ values do not appear separately, and most importantly, the private key, x, is never exposed during the decryption.

If there are many layers, and many edges from each layer to the next, then there are exponentially many source-to-sink paths, all of which achieve the same effect of implicitly decrypting with the private key without that key ever explicitly appearing during execution. For example, if there are 21 layers and every vertex in the first 20 layers has out-degree 10, then the number of different source-to-sink paths is 10^20. In that case, there are almost certainly more different source-to-sink paths than the total number of times the software will execute in its lifetime. Randomization can be used to select which source-to-sink path is used in a particular execution of the software. An adversary who carries out a differential analysis of various execution traces, thinking that the decryption routine executes in all of these traces and can therefore be pinpointed, is thereby foiled because different paths are used in different executions. This "raises the bar" and forces the adversary to do detailed semantic analyses of the code and its behavior.

The above descriptions used a layered graph to help explain the method. However, there is no need to use a layered graph in either of the above RSA or the ECC examples. A directed acyclic graph that is not layered can also be used for guiding the process of hiding the key. The main reason a layered graph was used in the above examples is to make the description easier to follow.

Hiding a Key in Hardware

Encryption is often used within tamper-resistant hardware, where the key is presumed to be safe from exposure. However, attacks on tamper-resistant hardware are feasible, and using the hiding technique described in the previous section within a tamper-resistant hardware provides a second line of defense, in case the adversary manages to defeat the existing hardware protection.

The ideas of the previous section can be used to amplify the security of moderately secure hardware, to achieve a much higher level of security. Specifically, if p is the probability that the moderately secure hardware is compromised, then the probability that the key is compromised can be brought down to p^k for any integer k of our choice, by using k copies of the hardware.

Figure 2:
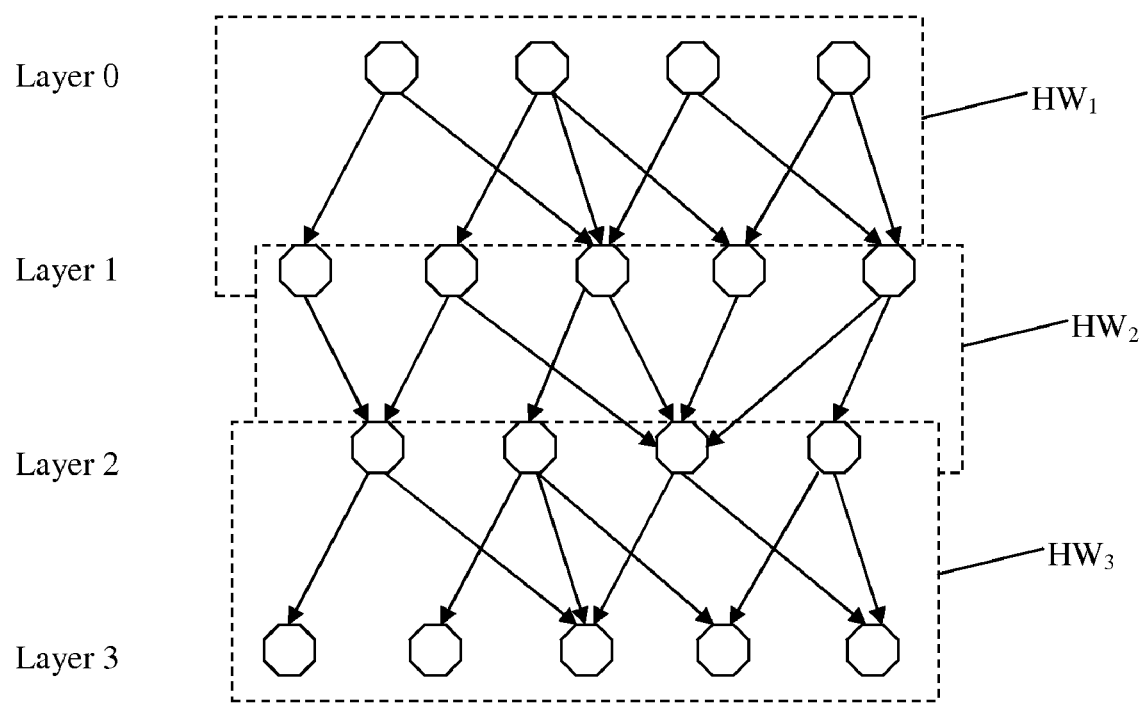
FIG. 2 shows a layered directed acyclic graph and its distribution across multiple hardware devices.

This can be achieved using the technique of the previous section in the following manner. A layered graph having k layers is generated, and k copies of the moderately secure hardware devices, call them $Hw_1, \ldots, Hw_k$ are used. An example using three hardware copies is shown in FIG. 2. In each copy of the moderately secure hardware, a copy of the whole layered graph is stored but only a subset of the edge values d(v,w) associated with the graph's edges are stored. For example, copy $Hw_j$ of the hardware contains only those values for edges from layer j−1 to layer j. To carry out a decryption, each copy of the hardware $Hw_j$ generates a portion of the source-to-sink path, but the k integer values on that path are not present in any single copy of the hardware, rather, each of the k values is in a separate copy of the hardware. Therefore, to decrypt with the secret key, the item to be decrypted is processed in sequence by each of the k hardware copies $Hw_1, Hw_2, \ldots, Hw_k$ in that order. In each $Hw_j$ copy of the hardware, the item to be decrypted undergoes that portion of the decryption computation that uses the relevant integer that is on the portion of the path in the $Hw_j$ hardware copy, i.e., the integer for the edge from layer j−1 to layer j along the source-to-sink path used for that particular decryption operation. Another decryption operation will use a different source-to-sink path which is likely to use a different integer in the $Hw_j$ hardware copy because it uses a different edge from layer j−1 to layer j.

Note that compromising only one hardware copy $Hw_j$ gives the adversary only the integers for the edges between layer j−1 and layer j, which are essentially random data. To get the secret key, the adversary must compromise all k copies of the hardware, and then correlate the random-looking data in each. If the probability of compromise of the data in a single copy of the hardware is p, then the probability of compromise of the proposed system of k layers, which has k copies of the hardware, is p^k. In practice, a value of k=3 (or even 2) may well be enough. For example, having k=3 would bring an unacceptable 0.001 probability of compromise down to a much better one-in-a-billion probability of compromise.

The fact that the "active" key or edge within each $Hw_j$ device changes for each decryption, makes an attack on even a single hardware device more difficult than if the same key had been used each time. This implies a lowered probability of compromise for a given $Hw_j$. Moreover, different systems (of k copies each) that implement the same private key, will each have their own random layered graph and hence different sets of random values within their respective copies of the hardware.

This technique makes it possible to use massively produced commercial off-the-shelf (COTS) decryption hardware that is only moderately secure to build a hardware decryption system that has dramatically higher security. The advantages of using massively produced COTS hardware are its low costs—the high production volumes for commercial use make such hardware essentially "commoditized" and of much lower cost than non-COTS (i.e., custom-built) hardware. The usual disadvantage with the use of low cost COTS hardware is that it has a higher probability of being compromised than special-purpose (more expensive) hardware. This disadvantage is dramatically reduced by the proposed technique.

Dynamically Evolving the Layered Graph

It is possible to modify the integers of the edges such that the graph, mutates after every use without changing the hidden key. Moreover, each modification can be localized to a vertex and its incident edges (hence no at-once wholesale modification of the whole graph is necessary, as the graph can be modified little by little as it is being used). The advantages of modifying the graph include the following: (i) if the adversary has spent considerable time figuring out some of the bits in an edge's integer (e.g., by using non-destructive probing attacks on a tamper-resistant hardware), then a modification to that integer nullifies the adversary's progress; (ii) it mitigates the security drawbacks of residual data properties of the memory material following a clearing event (because of the frequent over-writing of the memory cells with random-looking numbers—even the most sophisticated data-recovery techniques from cleared memory can look back only a limited number of write cycles). In other words, the integers on the edges of the graph become "moving targets" that must all be determined simultaneously prior to the next mutation A method for dynamically modifying the layered graph is the following. Let v be a vertex of the graph that is not in the first or last layers of the graph (neither a source nor a sink), let $y_1, y_2, \ldots$ be the integers on the edges that have their heads connected to vertex v, and let $z_1, z_2, \ldots$ be the integers on the edges that have their tails connected to vertex v. The modification then consists of 1. Generating a random r, and modifying every $y_i$ with that r. For example, in RSA this means replacing $y_i$ by $y_i * r$ mod(p−1)(q−1).
2. Modifying every $z_i$ with an r' that is the "inverse" of r for the cryptosystem under consideration. For RSA, r' would be the multiplicative inverse of r modulo (p−1)(q−1), and the modification done to every $z_i$ would consist of replacing $z_i$ by $z_i * r'$ mod(p−1)(q−1).

The key observation is that the net effect of the above change, on any source-to-sink path that goes through vertex v, is nil. This is because such a path uses exactly one $y_i$ and exactly one $z_j$ and hence the r that modified $y_i$ is cancelled out by it's inverse, r', that modified $z_j$.

The present invention has been described with reference to certain exemplary embodiments, variations, and applications. However, the present invention is defined by the appended claims and therefore should not be limited by the described embodiments, variations, and applications.

We claim:

1. A method for hiding a private encryption key, the method comprising:
   creating a directed acyclic graph comprising a plurality of vertices and a plurality of edges, the plurality of vertices including at least one source vertex and at least one sink vertex, each of the plurality of edges having a tail connected to a predecessor vertex and a head connected to a successor vertex, the predecessor vertex and the successor vertex being part of the plurality of vertices;

associating a vertex value r(v) with each vertex of the plurality of vertices, the vertex values associated with any pair of adjacent vertices being selected independently of each other;

associating a source value with each of the at least one source vertex, the source value being the same for each of the at least one source vertex;

associating a sink value with each of the at least one sink vertex, the sink value being the same for each of the at least one sink vertex and being a function of the source value and the private encryption key;

storing an edge value for each edge of the plurality of edges in a memory, the edge value being a function of $r(in)^{-1}$ and r(out) where $r(in)^{-1}$ is the functional inverse of the vertex value associated with the predecessor vertex connected to the tail of the edge and r(out) is the vertex value associated with the successor vertex connected to the head of the edge;

accepting an input message to a hardware device at one of the at least one source vertex;

processing the message on the hardware device along a directed path from one of the at least one source vertex to one of the at least one sink vertex; and outputting an output message from the hardware device at one of the at least one sink vertex, where the output message is an encrypted or decrypted version of the input message using the private encryption key; and wherein the output message is the same regardless of which of the plurality of vertices is on the directed path.

2. The method of claim 1, wherein the processing step comprises, for each edge of the directed path:

accepting an edge message from a predecessor vertex connected to the tail of the edge;

updating the edge message as a function of the accepted edge message and the edge value, wherein an r(v) value of one edge value is effectively canceled by an $r(v)^{-1}$ value of another edge value in the directed path; and outputting the updated edge message to a successor vertex connected to the head of the edge.

3. The method of claim 2, wherein the updating step of at least one edge of the directed path is obfuscated to appear different from the updating step of at least one other edge of the directed path.

4. The method of claim 1, further comprising:

storing the edge values associated with each edge of the plurality of edges; and not storing the vertex values associated with each vertex of the plurality of vertices.

5. The method of claim 1, further comprising:

randomly selecting the directed path from the one of the at least one source vertex to the one of the at least one sink vertex.

6. The method of claim 1, wherein the vertex values associated with the plurality of vertices except for the at least one sink vertex are selected randomly.

7. The method of claim 6, wherein the vertex values associated with the plurality of vertices except for the at least one sink vertex are selected randomly at runtime.

8. The method of claim 1, further comprising dynamically updating the directed graph.

9. The method of claim 8, wherein the dynamically updating the directed graph step comprises:

selecting a selected vertex of the plurality of vertices of the directed graph, the selected vertex not being one of the at least one source vertex or one of the at least one sink vertex;

selecting an update value for the selected vertex;

modifying the edge value of every edge having a head connected to the selected vertex as a function of the update value; and modifying the edge value of every edge having a tail connected to the selected vertex as a function of the functional inverse of the selected value.

10. The method of claim 9, wherein the update value for the selected vertex is randomly generated.

11. A system for hiding a private encryption key, the system comprising:

a graph memory device for storing a directed acyclic graph comprising a plurality of vertices and a plurality of edges, the plurality of vertices including a source vertex and a sink vertex, each of the plurality of edges having a tail connected to a predecessor vertex and a head connected to a successor vertex, the predecessor vertex and the successor vertex being part of the plurality of vertices;

a temporary protection memory for storing a vertex value r(v) associated with each vertex of the plurality of vertices; a source value associated with the source vertex; and a sink value associated with the sink vertex, the sink value being a function of the source value and the private encryption key, the vertex values associated with any pair of adjacent vertices being selected independently of each other;

an edge memory for storing an edge value associated with each edge of the plurality of edges, the edge value being a function of $r(in)^{-1}$ and r(out) where $r(in)^{-1}$ is the functional inverse of the vertex value associated with the predecessor vertex connected to the tail of the edge and r(out) is the vertex value associated with the successor vertex connected to the head of the edge;

an input for accepting a message at the source vertex;

a processor for processing the message along a directed path from the source vertex to the sink vertex; and an output for outputting the processed message at the sink vertex, wherein the processed message is an encrypted or decrypted version of the message accepted at the source vertex using the private encryption key; and wherein the output message is the same regardless of which of the plurality of vertices is on the directed path.

12. The system of claim 11, wherein the processor comprises a plurality of hardware devices, each hardware device of the plurality of hardware devices containing a portion of the directed graph, and processing requires passing the message through more than one of the plurality of hardware devices.

13. The system of claim 12, wherein the edge memory comprises a plurality of edge memory devices, an edge memory device being located on each of the plurality of hardware devices.

14. The system of claim 13, wherein a particular edge memory device of the plurality of edge memory devices located on a particular hardware device of the plurality of hardware devices stores the edge values for the edges of the portion of the directed graph stored on the particular hardware device and does not store the edge values for the edges of the portions of the directed graph not stored on the particular hardware device.

15. The system of claim 12, wherein the directed graph is a layered graph and each hardware device contains at least one layer of the directed graph.

16. The system of claim 11, wherein the temporary protection memory is used by the system at protect time and removed from the system prior to runtime by a user.

17. The system of claim 11, wherein the temporary protection memory is erased prior to providing the system to a user.

18. An apparatus for hiding a private key, the apparatus comprising:

a plurality of hardware devices, each hardware device storing one or more layers of a layered directed acyclic graph; the layered graph comprising a plurality of vertices and a plurality of edges forming a plurality of layers, the plurality of vertices including a source vertex and a sink vertex, a vertex value being associated with each of the plurality of vertices, the vertex values associated with any pair of adjacent vertices being independent of each other, each of the plurality of edges connecting an incoming vertex from a predecessor layer to an outgoing vertex of a successor layer, the incoming vertex and the outgoing vertex being part of the plurality of vertices and the predecessor layer and the successor layer being part of the plurality of layers;

wherein the plurality of hardware devices includes an input device for inputting an input message and an output device for outputting an output message, the output message being an encrypted or decrypted version of the input message; and wherein encryption or decryption of a the input message using the private key requires passing the message along a directed path through each of the more than one hardware devices, and wherein the output message is the same regardless of which of the plurality of vertices is on the directed path.

19. The apparatus of claim 18, further comprising a plurality of edge memory devices, one of the plurality of edge memory devices being located on each of the plurality of hardware devices, a particular edge memory device located on a particular hardware device storing an edge value for each of the edges of the layered graph stored on the particular hardware device.

20. The apparatus of claim 19, wherein the edge value for a particular edge of the plurality of edges is a function of $r(in)^{-1}$ and $r(out)$ where $r(in)^{-1}$ is a functional inverse of a predecessor vertex value associated with a predecessor vertex connected to the tail of the particular edge and $r(out)$ is a successor vertex value associated with a successor vertex connected to the head of the particular edge.

* * * * *